June 9, 1925.  
H. S. POWELL  
1,541,276  
JOINT FOR THE SPRINGS OF MOTOR VEHICLES  
Filed July 5, 1923
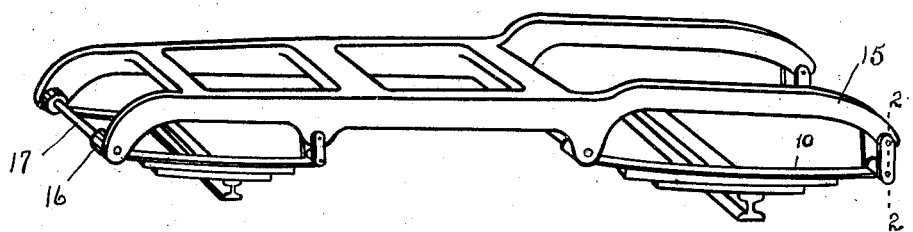
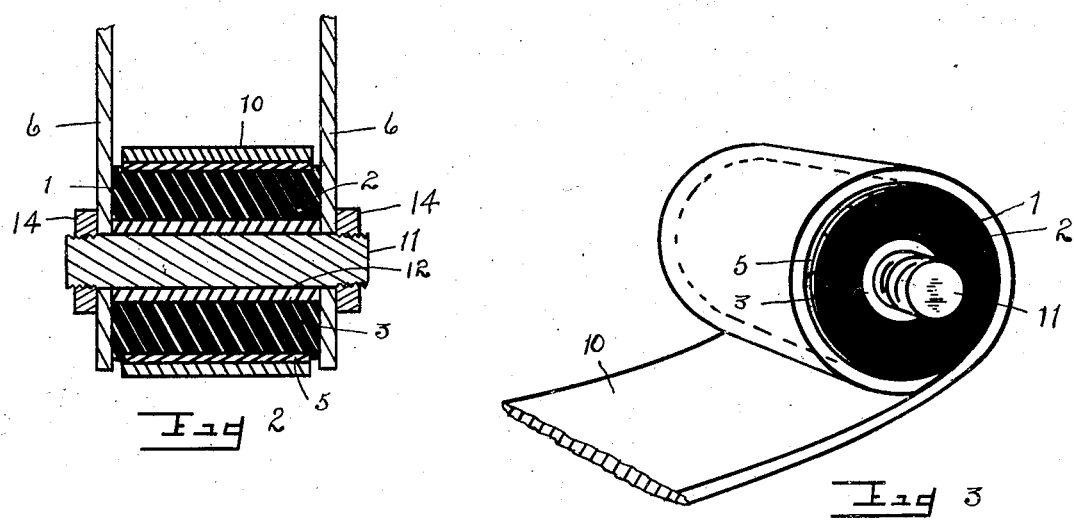
INVENTOR  
Herbert Spencer Powell  
BY Thomas L. Wilder  
ATTORNEY Patented June 9, 1925.

1,541,276

UNITED STATES PATENT OFFICE.

HERBERT SPENCER POWELL, OF NEW HARTFORD, NEW YORK.

JOINT FOR THE SPRINGS OF MOTOR VEHICLES.

Application filed July 5, 1923. Serial No. 649,500.

*To all whom it may concern:*

Be it known that I, HERBERT SPENCER POWELL, a citizen of the United States, residing at New Hartford, in the county of Oneida and State of New York, have invented certain new and useful Improvements in Joints for the Springs of Motor Vehicles, of which the following is a specification, reference being had therein to the accompanying drawing.

My invention relates to a joint for the springs of motor vehicles and I declare the following to be a full, clear, concise, and exact description thereof sufficient to enable anyone skilled in the art to which it appertains to make and use the same, reference being had to the accompanying drawings in which like reference characters refer to like parts throughout the specification.

The object of the invention is to provide a joint that can be removably attached or replaced when parts become broken or worn to the spring ends and shackels of motor vehicles, and to eliminate the use of oil at the joint and to improve the riding qualities of the springs.

The joint is of the removable kind and is made much in the nature of a cartridge, whereby it can be easily inserted within the bent over ends and shackels of any leaf spring.

The object will be understood by referring to the drawings, in which:

Fig. 1 is a perspective view of a motor vehicle chassis, showing the application of the joint;

Fig. 2 is a detail enlarged view of the joint, showing a central vertical section taken on the line 2—2 of Fig. 1;

Fig. 3 is a detail enlarged view, showing a perspective of the joint applied to the end of a spring, which is broken away;

Fig. 4 is a detail enlarged view, showing a central vertical section of a modified form of the joint;

Fig. 5 is a perspective view showing a still further modification of the joint.

Referring more particularly to the drawings, the joint embodies a cylindrical rubber bushing 1 that has a central recess 2. A metallic sleeve 3 is forced through recess 2 of bushing 1, as described in my former application filed December 8, 1922 and numbered serially 605,717. Recess 2 is of smaller diameter than sleeve 3, whereby the rubber 1 is crowded outwardly when sleeve 3 is inserted.

Rubber bushing 1, thus mounted on sleeve 3 is forced through a metallic shell 5, of lesser interior diameter, by the aforesaid process described in my former application, whereby rubber 1 will be compressed between the outer surface of sleeve 3 and the inward surface of shell 5. Moreover, sleeve 3 is a little shorter longitudinally than rubber bushing 1, whereby the ends of rubber bushing 1 will project beyond the edges of shell 5. The projecting portions of the rubber bushing 1 will make close contact with the sides of plates 6, 6 that form the shackle, when the members are assembled, and, thereby, hold rubber bushing 1 firmly against plates 6, 6 to prevent said rubber 1 from moving relative thereto.

The joint thus formed with the outer shell 5, inner sleeve 3 and rubber bushing 1 in between, is inserted much in the same manner that a cartridge is inserted in a gun in the turned over end of the leaf spring 10. A bolt 11 is disposed through the central recess 12 of sleeve 3. The ends of bolt 11 engage suitable recesses formed in the respective depending plates 6, 6 of the shackle. Nuts 14, 14 are screw mounted to the threaded ends of bolt 11, whereby to hold the joint in place and to force the sides of rubber 1 tightly against the surfaces of plates 6, 6. This will hold the rubber 1 firmly and prevent it from moving relative to plates 6, 6. The upper ends of plates 6, 6 are attached to the chassis 15 of the motor vehicle.

The cartridge joint can be slipped into the end of a spring, as at 16, which is united to a rod 17, in place of the shackle hereinbefore described. In this instance, however, rod 17 will be projected through the central recess 12 of sleeve 3.

Fig. 4 shows a modification of the joint. Here the rubber bushing 20 tapers at each end, as at 21, 21, so that it will not make contact with the surfaces of plates 6, 6, respectively of the shackle. Moreover, the taper at 21 of bushing 20 allows for an elastic side motion. The outer peripheral edges of shell 25 are bent inwardly, as at 26, whereby to form retaining members to hold shell 25 in correct position on rubber bushing 20. An annular indentation 27 is made in shell 25. This indentation will project down into rubber bushing 20 to aid also in holding shell 25 in correct position.

Shell 25 has formed on its outer surface an annular bead 30 that is adapted to abut against the contiguous edge of spring 31, when the joint is disposed in the rounded end of spring 31 in order to prevent the joint from moving laterally in one direction with reference to spring 31. A nut 32 screw mounted to the threaded exterior surface of shell 25 prevents the joint from moving in the opposite lateral direction and, thereby, holds said shell 25 firmly within the rounded end of spring 31.

Fig. 5 shows a still further modification. The outer shell 40 is square in cross section or rectangular. The bushing 41 is square also in cross section to conform to the shape of the shell 40. In other respects it is made like the joint described with reference to Figs. 2 and 3.

Having thus described my invention what I claim as new and desire to secure by Letters Patent is:

1. In a joint for the springs of motor vehicles, a shell containing a flexible material projecting beyond the edges of said shell, a sleeve passing through said flexible material, and means permitting said shell to be removably mounted to the spring ends and shackles of motor vehicles.

2. In a joint for the springs of motor vehicles, a shell containing a rubber bushing compressed therein, a sleeve passing through the center of said bushing, and means permitting said shell to be removably mounted to the spring ends and shackles of motor vehicles, said means having annular retaining members for holding said shell on said upper bushing.

3. In a joint for the springs of motor vehicles, a shell containing a rubber bushing compressed therein, a sleeve passing through the center of said bushing, and annular retaining members for holding said shell on said rubber bushing.

4. In a joint for the springs of motor vehicles, a shell having an outer bead, a rubber bushing having tapered sides disposed within said shell, an indentation within said shell whereby to aid in holding said shell relative to said rubber bushing and the outer peripheral edges of said shell being bent inwards to aid also in holding said shell and rubber bushing in correct position relative to each other.

5. In a joint for the springs of motor vehicles, a shell having an outer bead, a rubber bushing having tapered sides disposed within said shell, an indentation within said shell whereby to aid in holding said shell relative to said rubber bushing, the outer peripheral edges of said shell being bent inwards to aid also in holding said shell and rubber bushing relative to each other and means screw mounted to said shell to hold the same relative to said spring.

6. In a joint for the springs of motor vehicles, a shell having an outer bead, a rubber bushing having tapered sides disposed within said shell and an indentation in said shell whereby to aid in holding said shell relative to said rubber bushing, the outer peripheral edges of said shell being bent to aid also in holding said shell and rubber bushing relative to each other and a nut screw mounted to said shell to hold the same relative to said spring.

In testimony whereof I have affixed my signature.

HERBERT SPENCER POWELL.